US009499375B2

(12) United States Patent
Talonen

(10) Patent No.: US 9,499,375 B2
(45) Date of Patent: Nov. 22, 2016

(54) ELEVATOR WITH DETACHABLE DRIVE UNIT

(71) Applicant: KONE Corporation, Helsinki (FI)

(72) Inventor: Tapani Talonen, Tervakoski (FI)

(73) Assignee: KONE CORPORATION, Helsinki (FI)

( * ) Notice: Subject to any disclaimer, the term of this patent is extended or adjusted under 35 U.S.C. 154(b) by 421 days.

(21) Appl. No.: 14/157,763

(22) Filed: Jan. 17, 2014

(65) Prior Publication Data

US 2014/0130420 A1    May 15, 2014

Related U.S. Application Data

(63) Continuation of application No. PCT/FI2012/050783, filed on Aug. 13, 2012.

(30) Foreign Application Priority Data

Aug. 26, 2011    (FI) ..................................... 20115827

(51) Int. Cl.
| | | |
|---|---|---|
| *B66B 7/00* | (2006.01) | |
| *B66B 11/04* | (2006.01) | |
| *B66B 9/00* | (2006.01) | |
| *E04H 12/00* | (2006.01) | |
| *B66B 9/187* | (2006.01) | |

(52) U.S. Cl.
CPC .................. *B66B 11/04* (2013.01); *B66B 9/00* (2013.01); *B66B 9/187* (2013.01); *E04H 12/00* (2013.01); *F03D 13/20* (2016.05); *F03D 80/00* (2016.05); *Y02E 10/722* (2013.01)

(58) Field of Classification Search
CPC ......... B66B 11/04; B66B 9/00; B66B 9/187; F03D 13/20; F03D 80/00; F03D 11/04; E04H 12/00; Y02E 10/722

USPC ....... 187/239, 240, 242, 244, 250, 270, 271, 187/277, 391, 411, 414, 900; 52/123.1, 52/119, 40; 290/55
See application file for complete search history.

(56) References Cited

U.S. PATENT DOCUMENTS

| | | | | |
|---|---|---|---|---|
| 3,088,545 | A * | 5/1963 | Meyer | B66B 7/022 |
| | | | | 182/142 |
| 4,364,453 | A | 12/1982 | Sèrina | |
| 4,688,660 | A | 8/1987 | Kaneko | |
| 4,875,547 | A * | 10/1989 | Hanthorn | B66B 9/16 |
| | | | | 182/102 |
| 4,892,430 | A | 1/1990 | Liska et al. | |
| 6,505,785 | B2 * | 1/2003 | Willis | E02D 27/42 |
| | | | | 182/103 |
| 6,614,125 | B2 * | 9/2003 | Willis | F03D 1/001 |
| | | | | 290/45 |
| 6,888,264 | B1 * | 5/2005 | Willis | F03D 1/001 |
| | | | | 290/44 |
| 6,942,067 | B2 * | 9/2005 | Cholinski | B66B 5/027 |
| | | | | 187/258 |

(Continued)

FOREIGN PATENT DOCUMENTS

| | | |
|---|---|---|
| EP | 2 182 202 A2 | 5/2010 |
| GB | 916471 A | 1/1963 |

(Continued)

*Primary Examiner* — Anthony Salata
(74) *Attorney, Agent, or Firm* — Birch, Stewart, Kolasch & Birch, LLP

(57) ABSTRACT

An elevator including one or more hoisting members that are continuous in the vertical direction, a load-receiving part suspended on the hoisting member, and also a driving member engaging with the hoisting member for moving the load-receiving part. The driving member engaging with the hoisting member is configured to be driven with a detachable drive unit.

27 Claims, 6 Drawing Sheets

6a.  chuck
7.   electric motor
10.  encoder
16A. sensor
16B. sensor
17.  frequency converter
18.  elevator control unit
26.  brake control circuit

(56) References Cited

U.S. PATENT DOCUMENTS

| | | | |
|---|---|---|---|
| 7,931,254 B2 * | 4/2011 | Teichert | B66D 1/38 254/273 |
| 8,016,268 B2 * | 9/2011 | Oliphant | B66B 9/187 254/278 |
| 9,261,072 B2 * | 2/2016 | Davis | F03D 1/001 |
| 2007/0144129 A1 | 6/2007 | Daly | |
| 2010/0310375 A1 | 12/2010 | Hänisch | |
| 2011/0266096 A1 * | 11/2011 | Nies | B66B 9/16 187/251 |
| 2012/0279805 A1 | 11/2012 | Meyer et al. | |
| 2015/0298943 A1 * | 10/2015 | Garcia De La Pena Razquin | B66C 23/207 414/10 |

FOREIGN PATENT DOCUMENTS

| | | |
|---|---|---|
| JP | 08-282956 A | 10/1996 |
| JP | 11-209028 A | 8/1999 |
| JP | 2003-165680 A | 6/2003 |
| JP | 2004-338915 A | 12/2004 |
| WO | WO 2011/054833 A1 | 5/2011 |

\* cited by examiner 5. drive unit
34. horizontal support profiles 6a. chuck
7. electric motor
10. encoder
16A. sensor
16B. sensor
17. frequency converter
18. elevator control unit
26. brake control circuit 5. drive unit
9. machine bedplate
10. encoder
40. controller 5. drive unit
10. encoder 3. elevator car
20. generator
21. power shaping circuit 1. elevator
5. drive unit 25A. coil
27. magnetizing coil

ELEVATOR WITH DETACHABLE DRIVE UNIT

This application is a Continuation of PCT/FI2012/050783 filed on Aug. 13, 2012, which claims priority under 35 U.S.C. 119(a) to Patent Application No. 20115827 filed in Finland on Aug. 26, 2011, all which are hereby expressly incorporated by reference into the present application.

FIELD OF THE INVENTION

The invention relates to elevators, more particularly to methods for connecting and operating the drive units of elevators.

BACKGROUND OF THE INVENTION

The servicing work, installation work and repair work of an object to be serviced, such as a wind power station, an oil drilling platform, a lighthouse, et cetera, usually requires that the object comprises an elevator, with which it is possible to move and to lift a load in the vertical direction. The structure of this type of elevator can vary, but the elevator usually comprises an elevator car, a lifting platform or corresponding load-receiving part, with which a load is transferred. The load-receiving part is suspended on a hoisting member that is continuous in the vertical direction, such as on a hoisting rope or hoisting belt. The load-receiving part is moved along a vertical trajectory guided by a guide rail, a guide cable or corresponding. In some embodiments the hoisting member is also used as the guide rail/guide cable of the load-receiving part.

The driving force for moving the load-receiving part is usually produced with an electric drive. The electric drive comprises a hoisting machine, which comprises an electric motor. The driving force is transmitted from the electric motor to the hoisting member with e.g. a traction sheave or drum, driven by friction or by gears, of the hoisting machine. The traction sheave/drum is fixed to the rotating rotor or shaft of the electric motor. In addition, the hoisting machine can comprise one or more controllable machinery brakes, which engage with the shaft or traction sheave/drum to brake the movement of the traction sheave/drum. Supply of the driving power to the electric motor occurs e.g. with a frequency converter belonging to the electric drive or with a power supply device comprising other controllable solid-state switches.

The electric drive is conventionally disposed in a fixed manner in a site in connection with the rest of the elevator. In many of the aforementioned sites the elevator is regularly exposed to the outside air or to other corresponding environmental stressing. Owing to this, atmospheric moisture, salinity, cold, heat, solar radiation, wind, dirt and many other factors cause lifetime problems especially for the electric drive, control cards and other particularly sensitive components. It is quite normal that a serviceman arriving at a site must, before starting the actual servicing jobs, repair the elevator to working condition. Since many of the sites are located at the end of difficult transport connections, spare parts deliveries are also slow, slowing down servicing jobs and thus causing extra costs and standstills. Additionally, e.g. wind farms can comprise up to hundreds of turbine towers, each of which comprises a separate elevator with electric drive. Each aforementioned elevator in this case forms a potential reliability problem slowing down servicing.

For solving the problem an elevator can be protected by covering and/or proofing the operating environment of the elevator against the aforementioned environmental stresses. This, however, incurs additional costs and is otherwise often unreasonably awkward precisely because of, inter alia, the awkward transport connections. In addition, protection in different operating sites essentially intended to be open can even be impossible.

AIM OF THE INVENTION

The aim of the present invention is to solve the aforementioned drawbacks as well as the drawbacks disclosed in the description of the invention below. In order to achieve this, the invention discloses an elevator and a drive unit of a elevator, which has been made to be detachable from the rest of the elevator, in which case it can be brought to the operating site for the duration of a drive and it can be detached and transferred away from the operating site after the drive has ended. In this case the same drive unit can be used in a number of different sites and it can be stored in a protected space, so that the components of the drive unit that are susceptible to stress from the environment would not be damaged.

To achieve this aim the invention discloses an elevator according to claim 1, a drive unit according to claim 15, a method according to claim 29 for driving an elevator, and also wind power park according to claim 36. The preferred embodiments of the invention are described in the dependent claims. Some inventive embodiments and inventive combinations of the various embodiments are also presented in the descriptive section and in the drawings of the present application.

SUMMARY OF THE INVENTION

The elevator according to the invention comprises one or more hoisting members, a load-receiving part suspended on a hoisting member, which is preferably continuous in the vertical direction, and also a driving member connected to the hoisting member for moving the load-receiving part. The aforementioned driving member connected to the hoisting member is configured to be driven with a drive unit to be fixed for the duration of a drive to the driving member connected to the hoisting member.

In a preferred embodiment of the invention, the elevator comprises a connector, using which at least the electricity supply, control signal, measuring signal, and/or safety signal of the elevator can be both connected to the aforementioned drive unit and also detached from the aforementioned drive unit. In the most preferred embodiment of the invention both the connector and a possible counterpart for the connector in the drive unit are selected such that connection to the drive unit/detachment from the drive unit can be performed without separate tools. In the invention the term connector refers to a component intended for connecting, such as a screw connector, connection terminal or plug connector provided with a separate counterpart. The use of this type of connector facilitates and speeds up electrical connection, in which case the drive unit can be quickly and reliably connected into attachment with the elevator for the duration of a drive and detached from the elevator after the drive has finished.

According to the invention the drive unit can be brought to the operating site for the duration of a drive and it can be detached and transferred away from the operating site after the drive has ended. Consequently, the same drive unit can be used for driving an elevator that is fixed in its position in a location in a number of different sites and/or the drive unit can be stored in a protected space, so that the components of the drive unit that are sensitive to stress from the environment would not be damaged. In this case also possible repair jobs and servicing jobs of the drive unit can be performed centrally, e.g. in a service center, before the drive unit is transferred to the operating location of the hoisting apparatus. With a controllable drive unit the driving force for moving the load-receiving part is produced. The load-receiving part is moved with the drive unit in a controlled manner, by adjusting the power flow of the motor, preferably an electric motor, in the drive unit. The hoisting member can be a hoisting rope, a hoisting belt or a hoisting chain, in which case the driving member is preferably a traction sheave or a drum engaging with the hoisting member by frictional traction or by gear wheel traction; on the other hand, the hoisting member can also be e.g. a rotating elevating screw of a screw drive elevator, with the threads of which the driving member engages. In this case when the elevating screw and the driving member rotate in relation to each other the elevator car moves, depending on the direction of rotation, up or down in the elevator hoistway. The elevator according to the invention can also be a rack and pinion elevator, in which the elevator car moves, pulled by a gear wheel, along a rack up and down in the elevator hoistway.

In a preferred embodiment of the invention, the drive unit comprises a drive motor of the elevator and also a transmission means in connection with the drive motor for transmitting from the drive unit the driving force produced by the drive motor. The driving member comprises a connection interface for receiving the aforementioned transmission means of the drive unit.

In one preferred embodiment of the invention the driving member is configured to be fixed to the transmission means of the drive unit with a quick-release fastener. The quick-release fastener is, in its basic principles, a fastening means known in the art, by using which the drive unit can be connected to the driving member in the elevator quickly and reliably and can also be detached from the driving member quickly, in which case placing the elevator into operating condition/disassembly of the apparatus can occur quickly and conveniently. A shaft with a keyway, a splined shaft or some other multi-angular shaft fitting, for example, can also be used in the fixing between the driving member and the transmission means of the drive unit. Other connection methods known in the art, such as a crimped joint, magnetic joint, bolted joint or hexagonal joint or corresponding, can also be used for the fixing.

In one preferred embodiment of the invention the aforementioned transmission means of the drive unit is the shaft of the drive motor of the elevator, and the driving member is configured to be fixed to the shaft of the drive motor with a chuck. The shaft/chuck is in this case preferably provided with quick-release locking for speeding up the attachment/detachment of the drive unit.

In a preferred embodiment of the invention, the elevator comprises a machine bedplate, and the machine bedplate comprises a connection interface for receiving the frame part of a drive unit. The term machine bedplate refers to a structure that is fixed into position to bear and support the drive unit, more particularly owing to the force effects exerted on the drive unit by the driving member.

In one preferred embodiment of the invention, the elevator comprises a connector for taking the safety circuit of the elevator to the drive unit. This type of solution is advantageous particularly in hoisting apparatuses in which sensors measuring the safety of the hoisting apparatus are configured as a safety circuit of the hoisting apparatus. This type of sensor measuring the safety of hoisting apparatus can be e.g. a limit switch, which sets an extreme limit for movement of the load-receiving part. This type of data about the safety of the hoisting apparatus can be taken via the safety circuit to the drive unit, and the aforementioned safety data can be used in the control of the drive unit. On the other hand, some hoisting apparatuses according to the invention do not comprise the aforementioned safety circuit at all; additionally, in some solutions according to the invention also the safety circuit is fully disposed in the drive unit.

In one preferred embodiment of the invention the elevator comprises a connector for connecting the electrification of the elevator to the drive unit. Consequently, via the connector electric power can be supplied between the drive unit and the hoisting apparatus; in some embodiments by adjusting the flow of electric power also one or more electrical devices of the elevator, such as a luminaire, can be controlled. In some embodiments the drive unit receives its electricity supply wholly via the electrification of the hoisting device. In some embodiments the drive unit comprises a separate connector for connecting the drive unit to a power source. The aforementioned power source can be an electricity network; on the other hand, e.g. in connection with a hoisting apparatus fitted into a wind turbine tower, the power source can also be the generator of the wind turbine. Additionally, the hoisting apparatus and/or the drive unit can comprise a battery or an aggregate, which is used as a primary power source or as a secondary power source in addition to any of the aforementioned primary power source, e.g. in connection with a service outage of the primary power source.

In one preferred embodiment of the invention, the elevator comprises a sensor for measuring the operation of the elevator, and the elevator comprises a connector for taking the measuring signal of the sensor measuring the operation of the elevator to the drive unit. The aforementioned sensor can be e.g. an encoder measuring the movement of the driving member; in this case the movement of the driving member can be adjusted with the drive unit using measuring feedback received from the encoder. In another embodiment of the invention the aforementioned encoder is disposed in the drive unit to measure the speed of rotation of the transmission shaft of the drive unit. In addition to, or instead of, this a sensor/encoder can be configured to measure the movement of the hoisting member or the movement of the load-receiving part, e.g. with an encoder to be connected between the load-receiving part and a guide rail.

In one preferred embodiment of the invention, the elevator comprises a controllable machinery brake for braking the aforementioned driving member, and the elevator comprises a connector for taking the signal wire of the control signal of the machinery brake to the drive unit. In addition to, or instead of, a machinery brake, also a guide rail brake, braking the elevator car, to be connected between the elevator car and a guide rail and/or a rope brake/belt brake to be connected to the hoisting member and/or to a separate safety rope supporting the elevator car, can be used for braking the elevator.

In one preferred embodiment of the invention the elevator is disposed in the tower of a wind power turbine.

In one preferred embodiment of the invention, the elevator comprises a compensating weight, most preferably at least two compensating weights, which is/are suspended to support the load-receiving part by the aid of one or more hoisting members and also by the aid of diverting pulleys such that the compensating weight(s) compensate(s) the force effect exerted on the driving member from the weight of the load-receiving part.

In one preferred embodiment of the invention the aforementioned controllable drive unit is configured to be connected to an elevator in connection with the entrance of the elevator, such as in the bottom end zone of the elevator tower, for instance the turbine tower of a wind power turbine. Consequently, it is easy for a serviceman arriving at the operating location to fix a drive unit to the elevator, and the drive unit does not need to be lifted higher in the elevator tower.

In some embodiments, such as on oil drilling platforms, there might be elevator hoistways that open downwards and which are consequently accessible from the top part of the elevator hoistway. In this case the driving member according to the invention to be connected to the hoisting member as well as the drive unit to be connected to the driving member are most preferably disposed in the top part of the elevator hoistway, in which case also the suspension/reeving of the elevator is designed using some prior-art suspension/reeving solution applicable to a drive unit/driving member to be disposed in the top end zone.

In one preferred embodiment of the invention the elevator is disposed in a hoistway, which is at least partly open to the effect of outdoor air.

In one preferred embodiment of the invention the drive unit is configured to be fixed in connection with the load-receiving part, for moving along with the load-receiving part. In this case the driving member is rotatably supported on the load-receiving part.

The controllable drive unit according to the invention for driving an elevator that is fixed in its position in a location is provided with connection means for connecting the drive unit to the elevator for the duration of a drive of the elevator.

The drive unit according to the invention is preferably configured to be connected to an elevator according to the invention.

In one preferred embodiment of the invention the connection means are configured to connect the drive unit to the elevator using a detachable connection method.

In a preferred embodiment of the invention, the drive unit comprises a drive motor of the elevator, and the aforementioned connection means comprise a transmission means for transmitting from the drive unit the driving force produced by the drive motor.

In a preferred embodiment of the invention the aforementioned transmission means of the drive unit is configured to be fixed to the driving member. The transmission means can be connected to the driving member directly or e.g. via a gear, preferably via a reduction gear, or by belt friction via a separate drive belt and traction sheave. In some embodiments a gear is disposed in the drive unit; it is however advantageous to dispose the gear outside the drive unit in a fixed manner on a part of the elevator situated at the operating location, because then the size and weight of the drive unit decrease and transfer of the drive unit becomes easier.

In one preferred embodiment of the invention the aforementioned transmission means of the drive unit is configured to be fixed to the part moving the hoisting member with a quick-release fastener.

In a preferred embodiment of the invention the aforementioned transmission means of the drive unit is the shaft of the drive motor of the elevator. In one preferred embodiment of the invention the shaft of the drive motor is configured to be fixed to the driving member with a chuck.

In one preferred embodiment of the invention the connection means comprise a connector for the safety circuit of the elevator.

In one preferred embodiment of the invention the drive unit comprises one or more sensors for determining the connection status of the drive unit. Since the aforementioned sensor(s) is/are often sensitive to stressing caused by the environment, by disposing the sensor(s) in the drive unit the reliability problem caused by environmental stressing of the sensor(s) can be reduced. On the other hand, according to the invention a solution would also be possible wherein the sensor(s) is/are disposed in the elevator outside the drive unit; in this case, however, attention must be paid to protecting the sensors from environmental stresses.

In one preferred embodiment of the invention, the elevator comprises a machine bedplate for receiving the drive unit, and a sensor determining the connection status of the drive unit is configured to detect the presence of the drive unit in the machine bedplate and/or the locking of the drive unit in the machine bedplate, such as e.g. the position of the type of locking latch with which the drive unit is locked into the machine bedplate. On the basis of the presence data obtained from the sensor, a run with the elevator can in this case be prevented if the drive unit is not connected into position in the machine bedplate.

In one preferred embodiment of the invention the sensor determining the connection status of the drive unit is configured to detect the fixing between the transmission means of the drive unit and the driving member. On the basis of the fixing data being obtained from the sensor, a run with the elevator can in this case be prevented if the fixing between the transmission means and the driving member is not in order.

In some embodiments of the invention, the drive unit and the machine bedplate are shaped such that the drive unit cannot be lowered into its position in the machine bedplate before the drive unit is fitted into position in connection with the driving member or, alternatively, such that a connection between the drive unit and the driving member is not possible if the drive unit is not in its position in the machine bedplate. In this way by the aid of just one safety switch, or even without separate safety switches, it can be ensured that the drive unit is connected to be properly attached to the driving member as well as to the machine bedplate.

In some embodiments of the invention, the drive unit comprises a brake control circuit, and the connection means comprise a connector for taking the brake control signal formed by the brake control circuit from the drive unit to the machinery brake.

In some embodiments of the invention, a drive with the elevator is arranged to be stopped/prevented with the drive unit, by disconnecting in the drive unit the power supply to the drive motor and also by additionally forming in the drive unit an activation signal for activating the machinery brake.

In one preferred embodiment of the invention the aforementioned one or more sensors determining the connection status of the drive unit are connected in the drive unit with a signal wire to the safety circuit of the elevator. In this way a safety circuit can be formed also in solutions in which the safety circuit is disposed wholly in the drive unit. Since the aforementioned sensor(s) as well as other electronic and electrical components, with their wiring, that possibly belong to the safety circuit are often sensitive to stressing caused by the environment, by situating the safety circuit in the drive unit the reliability problem and safety problem caused by environmental stressing can be reduced.

In one preferred embodiment of the invention the drive unit comprises a controllable power supply device of the drive motor. This type of solution is advantageous because the controllable power supply device comprises controllable solid-state switches, control electronics and other such components that are easily damaged in an operating environment with demanding environmental conditions. In some embodiments the drive unit also comprises a contactor or corresponding for isolating the aforementioned controllable power supply device from the electricity network supplying the power supply device.

In one preferred embodiment of the invention the drive unit comprises a control unit of an elevator. Also the control unit of an elevator comprises components that are susceptible to damage owing to the stressing of the environment. In a preferred embodiment of the invention the control unit of the elevator comprises a microprocessor and also a memory, in which elevator control functions and/or algorithms to be run on the microprocessor can be saved.

In one preferred embodiment of the invention the connection means comprise a connector for taking the signal wires from a user interface fitted in the elevator car to the control unit of the elevator. Consequently the elevator can be driven with the user interface from the elevator car.

In the method according to the invention for driving an elevator a movable drive unit of an elevator is temporarily connected into attachment with an elevator permanently fixed in its position for a drive of the elevator.

In a preferred embodiment of the invention the drive unit is transferred to the operating location before the start of the drive of the elevator, the elevator is driven with the drive unit temporarily connected in attachment to the elevator, the drive unit is detached from the elevator after the drive of the elevator has finished, and also the drive unit detached from the elevator is transferred away from the operating location after the drive of the elevator has finished.

According to the invention, the drive unit of an elevator can be stored e.g. in a service center outside the time of use.

In one preferred embodiment of the invention at least two different elevators are driven at different times with the same drive unit.

In one preferred embodiment of the invention the drive unit comprises a lifting lug for transferring the drive unit. In this case the drive unit can be connected by the lifting lug to a special transfer device, with which the drive unit is transferred to/from an operating site. On the other hand, the lifting lug can also be a manual carrying handle, holding onto which a serviceman can carry the drive unit.

The wind farm according to the invention comprises a plurality of wind power stations, each of which comprises a turbine tower for a wind turbine. An elevator according to the invention is fitted into each of the aforementioned turbine towers.

The invention also relates to a method for modernizing an elevator. In the method the old hoisting motor, plus power supply apparatus, of an elevator is removed from the elevator, and also a driving member is connected to the hoisting member of the elevator, which driving member is configured to be driven with a controllable drive unit that is detachable from the aforementioned driving member. In a preferred embodiment of the invention a connection interface to the elevator is formed for receiving the aforementioned detachable, controllable drive unit.

The elevator according to the invention is extremely well suited for use, in addition to wind power stations, also in e.g. radio masts, oil drilling platforms, construction sites, lighthouses, and in other such sites in which an elevator tower/hoistway is at least partly open or otherwise subjected to demanding environmental conditions. This is because of the fact that by means of the invention the reliability problems/malfunctioning problems caused by demanding environmental stresses, such as atmospheric moisture, salinity, cold, heat, snow/ice, solar radiation, wind, water, dirt, construction dust, et cetera, on the sensitive components of the drive unit, such as on the motor windings, bearings, solid-state switches, safety switches, control cards or uninsulated connections, can be reduced.

In some embodiments of the invention, the elevator control unit in the drive unit comprises a user interface, such as a run button or run handle, with which the elevator can be driven manually. In some embodiments the aforementioned user interface is disposed outside the drive unit such as in the end zone of the elevator hoistway and/or in the elevator car; in this case the drive unit can be connected to the user interface with a wireless data transfer channel, or with a data transfer cable via the connector, for sending a control signal of the elevator from the user interface to the drive unit.

The drive unit can comprise a memory, in which is recorded data about the hoisting apparatus or about some other drive object. The data can be analyzed centrally e.g. in a service center. From the analyzed data, inter alia, the operating condition and/or operational capability of a hoisting apparatus or of some other drive object, such as of a wind power station, can be determined in respect to e.g. energy efficiency, quantity of electric power produced, detected service interruptions or other functional nonconformities. For this purpose, the drive unit can comprise a receiver for receiving data from the control circuit of the hoisting apparatus or from some other data management unit disposed in the drive object.

The aforementioned summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Embodiment 1

Figure 1A:
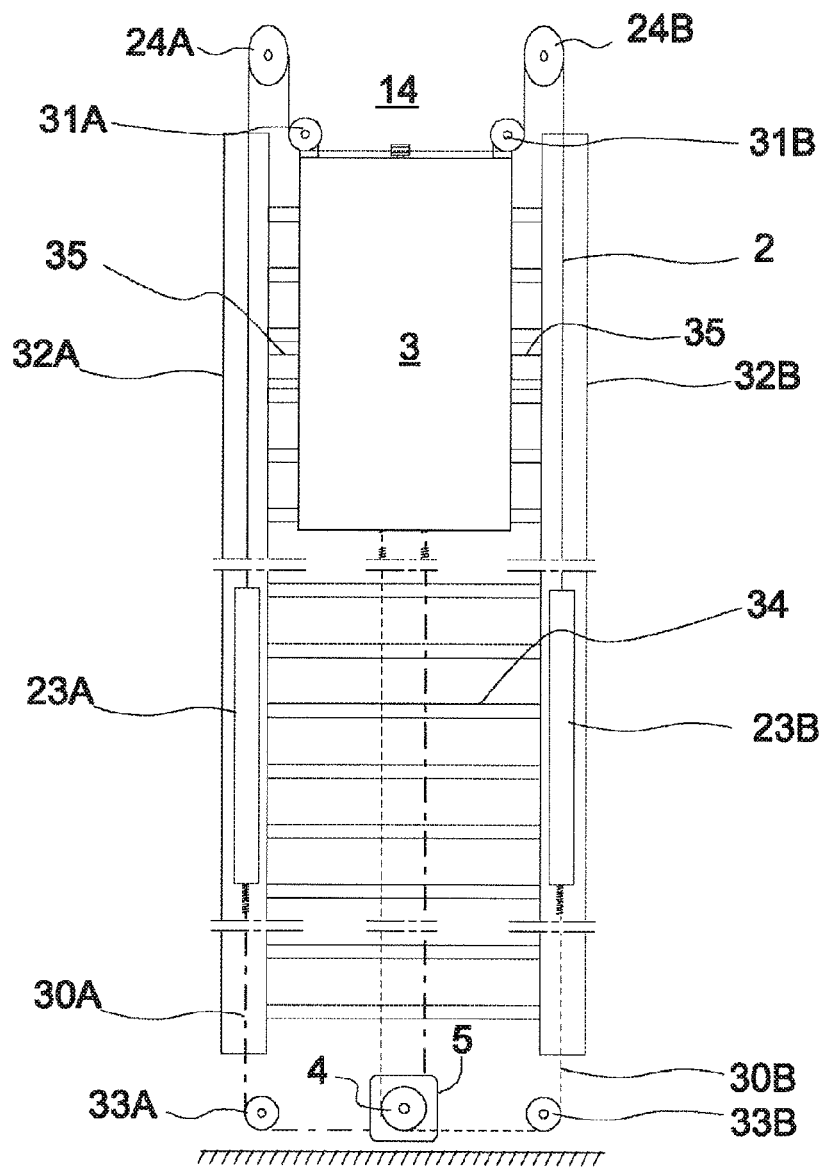
FIG. 1a presents a diagrammatic view of an elevator according to an embodiment of the invention.
Figure 1B:
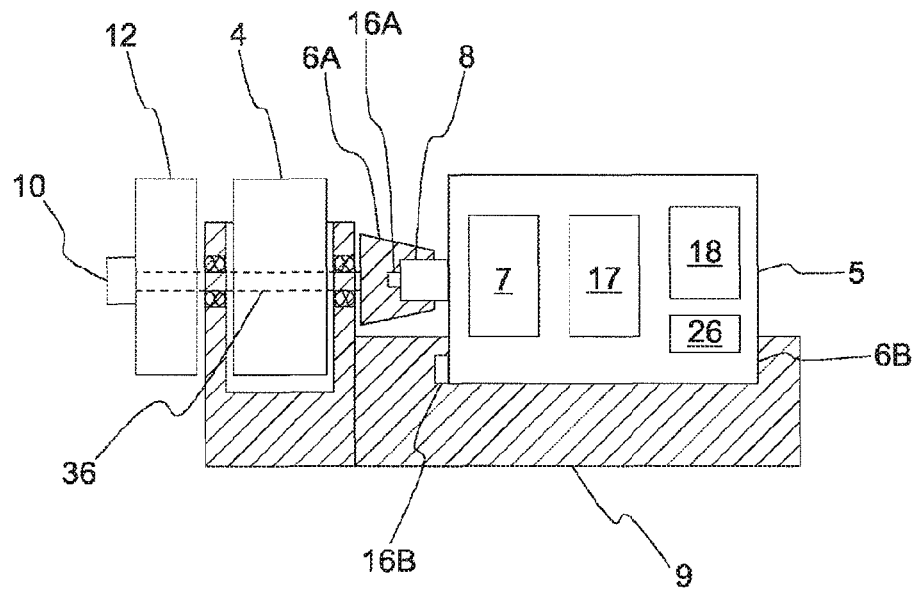
FIG. 1b presents a diagrammatic side view of a drive unit according to the embodiment of FIG. 1.
Figure 4:
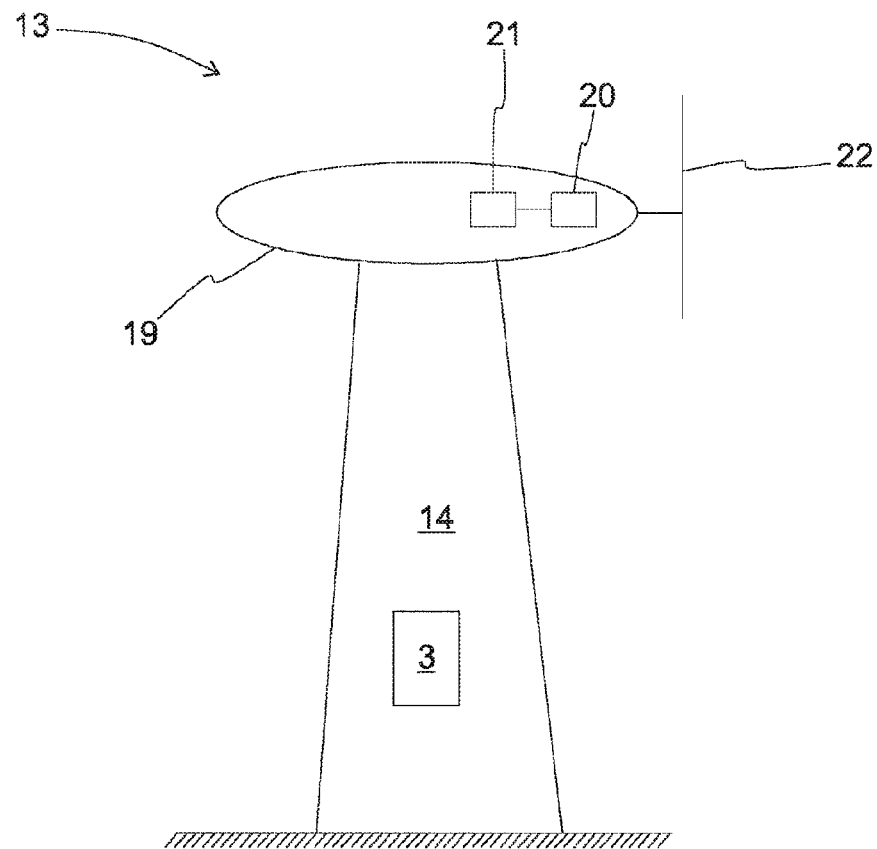
FIG. 4 presents a diagrammatic view of a wind power station comprising an elevator according to the invention.
Figure 5:
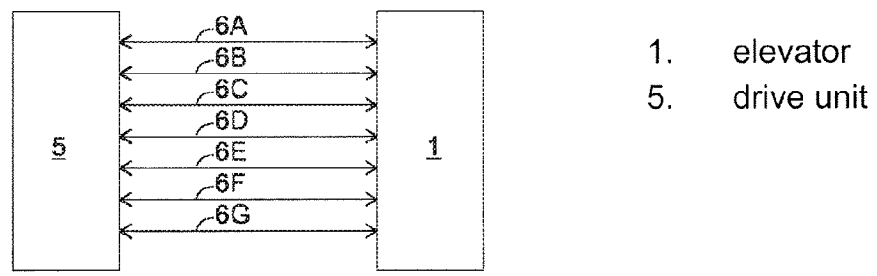
FIG. 5 presents as a block diagram a connection interface of an elevator according to the invention.

The elevator presented in FIG. 1a can function e.g. as a service elevator of a wind power station 13 according to FIG. 4. The elevator car 3 in FIG. 1 is suspended in the elevator car 14 on a cable 2, which travels from diverting pulleys 31A, 31B fixed in a manner allowing rotation to the top part of the elevator car 3 via diverting pulleys 24A, 24B fixed in a manner allowing rotation to a supporting structure in the top part of the elevator tower 14 downwards by the sides of the elevator car 3 along parallel hollow profiles 32A, 32B and are fixed to compensating weights 23A, 23B, which also travel in the aforementioned hollow profiles 32A, 32B. Fixed to the compensating weights 23A, 23B are also belts 30A, 30B, which travel in the same hollow profiles 32A, 32B downwards from the compensating weights 23A, 23B via diverting pulleys 33A, 33B fixed in a manner allowing rotation to a supporting structure of the bottom end zone of the elevator tower to the traction grooves of the traction sheave 4, and from the traction grooves of the traction sheave upwards and are fixed to the bottom part of the elevator car 3. The aforementioned hollow profiles 32A, 32B are preferably disposed and shaped such that they also function as guide rails guiding the elevator car, or separate guide rails are fixed to the hollow profiles 32A, 32B for guiding the elevator car 3. Owing to this the elevator car engages with the hollow profiles 32A, 32B with guide shoes 35, which in this embodiment of the invention are sliding guide shoes, but also e.g. roller guide shoes are possible. The elevator car moves when the belts 30A, 30B are moved by rotating the traction sheave 4. The compensating weights 23A, 23B suspended according to FIG. 1 support the elevator car 3 and compensate the force effect that would otherwise be exerted on the belts 30A 30B, and via the belts 30A, 30B onwards onto the traction sheave 4, from the weight of the elevator car 3. The compensating weights 23A, 23B are preferably dimensioned such that the compensating weights fully, or almost fully, compensate the weight of the empty elevator car 3 such that when it is released to move freely the elevator car 3 sinks only slowly downwards in the elevator tower 14. The aforementioned parallel hollow profiles 32A, 32B are fixed to each other with horizontal support profiles 34, the vertical distance between each other of which is selected such that the support profiles 34 also function as a ladder, along which a serviceman can climb and descend in the elevator tower 14. The elevator car 3 is driven with a drive unit 5 to be fixed to the traction sheave 4. The components of the drive unit 5 according to FIG. 1a as well as the other components of the hoisting function of the elevator relating to the drive unit 5, which are for the sake of clarity omitted from FIG. 1a, are presented in more detail in FIG. 1b. In FIG. 1a the traction sheave 4 is viewed from the front, whereas in FIG. 1b the traction sheave 4 is presented as viewed from the side. According to FIG. 1b, an encoder 10 is fitted to the end of the rotating shaft 36 of the traction sheave 4, which encoder measures the speed of the traction sheave 4 and functions as a speed feedback to the speed regulator of the elevator car, which speed regulator is disposed in the drive unit 5 in connection with the elevator control unit 18. In addition, in connection with the traction sheave 4 are one or more controllable machinery brakes 12, which when activated engage mechanically with the braking surface of the rotating shaft 36 of the traction sheave 4 to brake the movement of the traction sheave 4.

The drive unit 5 is made to be transferrable by providing the drive unit 5 with connection means, with which the drive unit 5 can be temporarily connected to an elevator using a detachable connection method. Correspondingly, the elevator 1 is provided with a connection interface, to which the drive unit 5 is connected. The drive unit 5 comprises an alternating-current motor 7, the rotating rotor of which is fixed to a shaft 8, via which the driving force of the electric motor 7 is transmitted from the drive unit 5. Additionally, the drive unit 5 is connected with a supply cable and a connector to an electricity network at the operating location, and the drive unit 5 comprises a frequency converter 17 connected to the electricity network, with which frequency converter variable-frequency variable-amplitude electric current is supplied to the motor 7. In some other embodiments the power supply to the alternating-current motor is implemented directly from an electricity network by connecting the phases of the motor to the electricity network with contactors, thyristors or corresponding, in which case the drive unit 5 does not comprise a separate frequency converter, but instead the supply frequency of the motor, and thus the rotational frequency of the motor, is essentially constant, or the rotational frequency of the motor is changed by the aid of gearing. At the end of the shaft 8 of the drive unit is a spindle, which is fixed concentrically to the shaft 36 of the traction sheave 4 with a chuck 6A, which in this embodiment of the invention is fixed to the traction sheave 4; on the other hand, the chuck could also be on the shaft 8 of the drive unit 5, in which case the traction sheave would comprise a counterpart/spindle to which the chuck 6A is fitted. The fixing between the spindle at the end of the shaft 8 and the chuck 6A is implemented with a quick-release fastening that is per se known in the art, owing to which the drive unit 5 can be fixed to the traction sheave 4 and detached from the traction sheave 4 by hand quickly, without needing to use special tools for attachment/detachment. The fixing method of the drive unit 5/traction sheave 4 can be in its basic principles of the same type as in power drills, in which the chuck 6A is compressed into attachment with the spindle in the chuck by rotating the chuck 6A around its axis of rotation. On the other hand, the fixing between the shaft 8 of the drive unit 5 and the traction sheave 4 can also be implemented using other prior-art fixing methods and fixing means, such as bolts, nuts, wing screws, et cetera, if the aforementioned fixing means are configured such that they are easily accessible for rapid attachment and detachment of the drive unit 5.

In the bottom end zone of the elevator tower 14 is a machine bedplate 9, which is disposed in a fixed manner into position in the pit of the elevator hoistway. The machine bedplate 9 is shaped so that the drive unit 5 can be lowered from above into the machine bedplate and so that the frame part of the drive unit 5 can be locked into position in the machine bedplate 9 with manually-operated quick-release fasteners 15. For this purpose, the drive unit 5 comprises protrusions (not in figure) for receiving the locking lugs in the quick-release fasteners. On the other hand, the fixing between the drive unit 5 and the machine bedplate 9 can also be implemented using other prior-art fixing methods and fixing means, such as bolts, nuts, wing screws, et cetera, if the aforementioned fixing means are configured such that they are easily accessible for rapid attachment and detachment of the drive unit 5.

Figure 6:
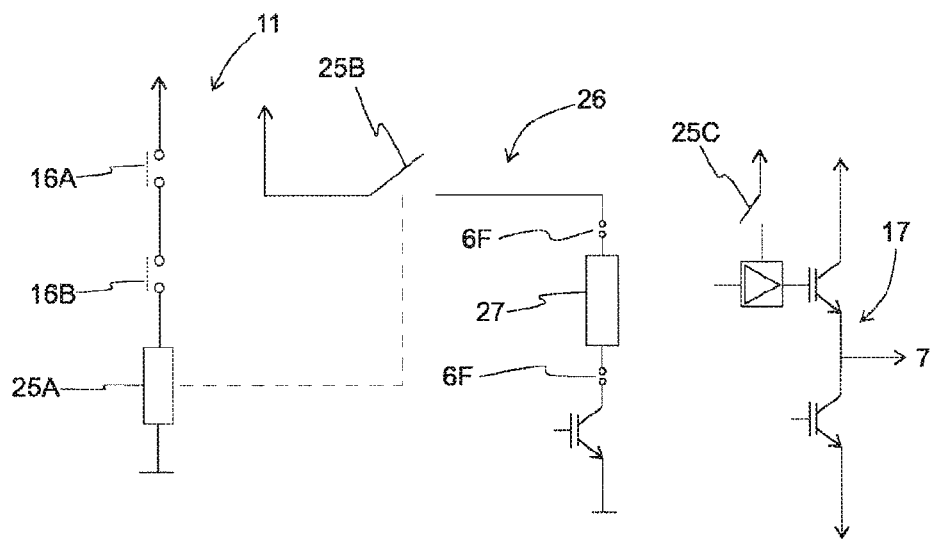
FIG. 6 presents as a circuit diagram a safety circuit of an elevator according to the invention.

The drive unit 5 also comprises sensors 16A, 16B, which are configured to detect the connection status of the drive unit 5, i.e. whether the drive unit 5 is properly fixed into its position in the connection interface of the elevator 1. The drive unit 5 comprises a sensor 16A, which is configured to detect the fixing between the drive unit 5 and the traction sheave 4; the sensor 16A is preferably a positive opening safety switch, the contact of which closes when the spindle of the shaft 8 of the drive unit is pressed into position in the chuck 6A on the traction sheave 4 and which contact opens when the spindle 8 is pulled out of the chuck 6A. In addition, the drive unit 5 comprises a sensor 16B, which is configured to detect the presence of the drive unit 5 in the machine bedplate 9; also this sensor 16B is preferably a positive opening safety switch, the contact of which closes when the drive unit 5 is lowered into position in the machine bedplate 9 and which contact opens when the drive unit 5 is lifted out of the machine bedplate 9. The safety switches 16A, 16B determining the connection status of the drive unit are connected in the drive unit 5 with a signal wire to the safety circuit 11 of the elevator, the circuit diagram of which safety circuit is according to FIG. 6. In FIG. 6, the safety switches 16A, 16B determining the connection status of the drive unit 5 are connected in series with the coil 25A of a safety relay such that current supply to the coil 25A of the safety relay disconnects when either safety switch 16A, 16B opens; when the current supply to the coil 25A ceases also the contacts 25B, 25C of the safety relay open. The contact 25B of the safety relay is fitted into the control circuit 26 of the machinery brake 2 such that the machinery brake activates when the contact 25B of the safety relay opens. Additionally, the second contact 25C of the safety relay is fitted into the control circuit of the IGBT transistors of the frequency converter 17 such that the aforementioned IGBT transistors open and the power supply to the electric motor 7 disconnects when the aforementioned second contact 25C of the safety relay opens. Consequently, when the safety switch 16A, 16B is open the machinery brake 2 is activated and the power supply to the electric motor 7 is disconnected, so that also a drive with the elevator is prevented if the safety switch(es) detect that the drive unit 5 is not properly connected into attachment with the elevator 1. The brake control signal is taken from the brake control circuit 26 of the drive unit 5 to the magnetizing coil 27 of the machinery brake 2 with a brake cable, which is connected to the brake control circuit 26 in the drive unit 5 with a connector 6F.

In some embodiments the aforementioned safety switches 16A, 16B are disposed in a fixed manner outside the drive unit 5 of the elevator 1; in this case, however, it must be ensured that the safety switches are adequately protected against the stresses of the operating environment for, inter alia, preventing oxidation of the switch contacts. In addition to, or instead of, the aforementioned, the elevator can also comprise other safety switches outside the drive unit 5. In some embodiments the safety switch is disposed in connection with the door (not in figure) of the elevator car 3 such that a drive with the elevator stops when the door of the elevator car 3 opens. In some embodiments a safety switch is fitted in connection with a collision detector (not in figure) that is disposed on the bottom of the elevator car and/or on the top of the elevator car and moving along with the elevator car such that the safety switch opens and the elevator stops when the collision detector collides with the end of the elevator tower 14. In some embodiments the elevator comprises an overspeed detector, which activates a mechanical safety device braking the movement of the elevator car as a consequence of overspeed of the elevator car. In this case a safety switch can be fitted in connection with the overspeed detector of the elevator car such that the contact of the safety switch opens as a consequence of overspeed. In some embodiments the elevator comprises an overload detector, and a safety switch is fitted in connection with the overload detector such that the contact of the safety switch opens as a consequence of an overload of the elevator car.

The drive unit 5 also comprises a connector, via which the measuring cable of the encoder 10 measuring the speed of the traction sheave 4 is connected to the drive unit 5.

In connection with the elevator control unit 18 is a user interface (not in figure) comprising pushbuttons, when pressing which the elevator car 3 is driven in the elevator hoistway 14 either upwards or downwards according to the movement direction determined by the pushbutton. In some embodiments the elevator car 3 also comprises corresponding pushbuttons for driving the elevator car; in this case the pushbuttons in the elevator car 3 are connected with a signal cable to a connector in the drive unit 5 and via the connector onwards to the elevator control unit 18 in the drive unit 5, so that the elevator can be driven from the elevator car with the pushbuttons in the user interface of the elevator car.

A serviceman brings a drive unit along with him/her to the servicing location and gets the elevator into drive condition by connecting the drive unit 5 into attachment with the mechanical and electrical connection interface of the elevator 1. After this the serviceman performs the necessary jobs, using the elevator 1 in the turbine tower 14 for moving as well as for transferring tools and spare parts according to need. Servicing work is also performed at the top in the nacelle 19, in which in the embodiment of FIG. 4 the generator 20 driven by the blades 22 of the turbine as well as a power shaping circuit 21, with which the electric power obtained from the generator 20 is shaped for supplying to the electricity network, are disposed. After performing the servicing work the serviceman detaches the drive unit 5 from the elevator 1 and takes the drive unit 5 along with him/her to the next servicing site, such as to the next wind power station, in which the drive unit 5 is again connected to the elevator 1 of the servicing site in question for working in the servicing site. When the worksites specified to be worked on are completed, the serviceman takes the drive unit 5 along with him/her for storing in a service center or in some other protected location, so that the components of the drive unit that are sensitive to environmental stressing do not become damaged.

Embodiment 2

Figure 2:
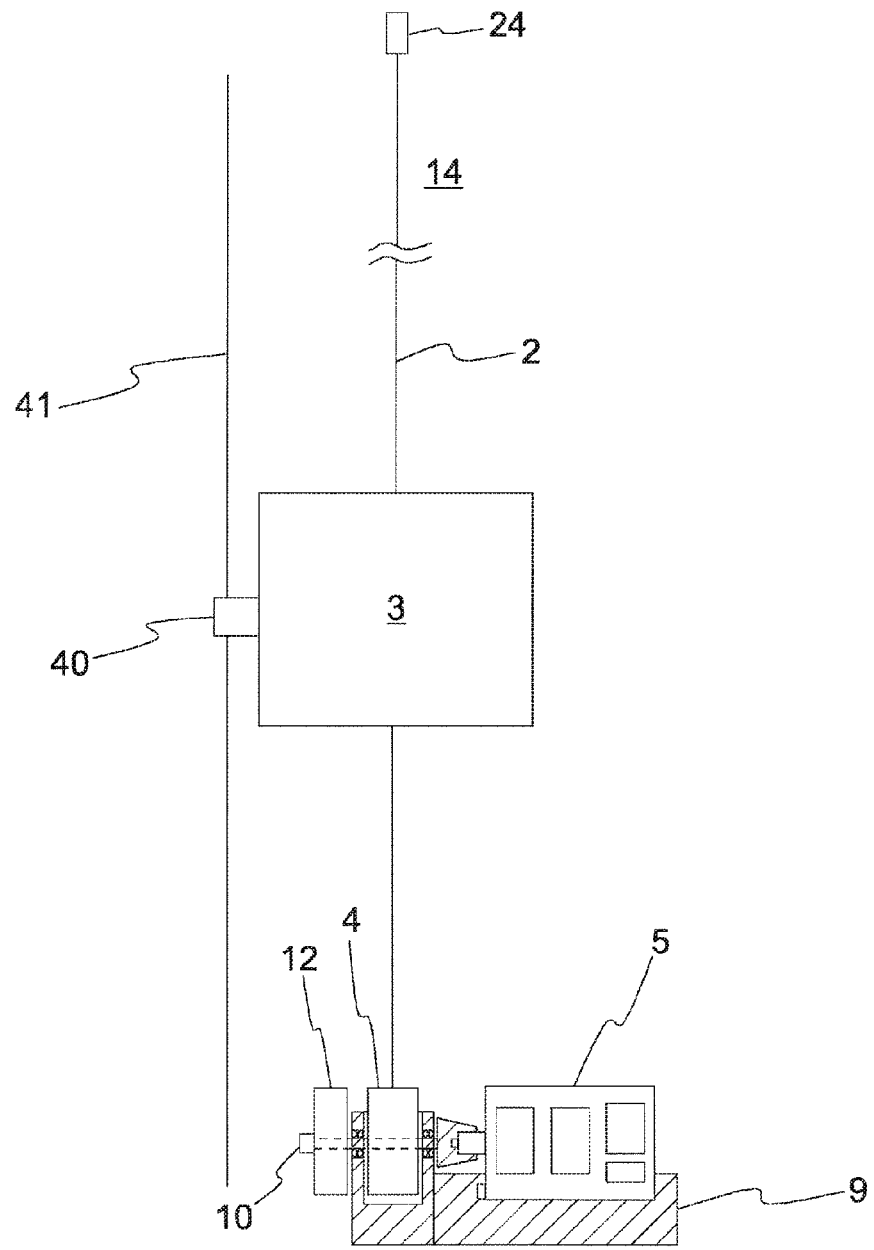
FIG. 2 presents a diagrammatic view of an elevator according to a second embodiment of the invention.

The elevator 1 of FIG. 2 differs from the elevator presented in FIG. 1a in that the elevator car 3 is suspended on a cable 2 in the elevator 14, which cable travels downwards from the elevator car 3 via a diverting pulley 24 in the top part of the elevator tower 14 to a drum collecting, distributing cable 2 as it rotates, said drum being in the bottom end zone of the elevator tower 14. The elevator car 3 moves when the drum 4 is rotated with a drive unit 5 temporarily fixed to the drum 4. In addition, in connection with the drum 4 are one or more controllable machinery brakes 12, which when activated engage mechanically with the braking surface of the drum/drum shaft to brake the movement of the drum 4. The elevator car is controlled with a separate control cable 41, to which the elevator car 3 is connected with a controller 40.

The drive unit 5 is in its basic principles according to embodiment 1, comprising the same functional parts; also the fixing of the shaft of the electric motor in the drive unit 5 onto the rotating drum is of the same type as the fixing between the shaft 8 and the traction sheave 4 in embodiment 1. Also the safety circuit of the elevator as well as the electrical connection interface of the drive unit 5 to the elevator 1 are implemented in essentially the same way as in embodiment 1. The drive unit 5 can also be transferred and used in servicing work and maintenance work in essentially the same way as is described above in embodiment 1.

Embodiment 3

Figure 3:
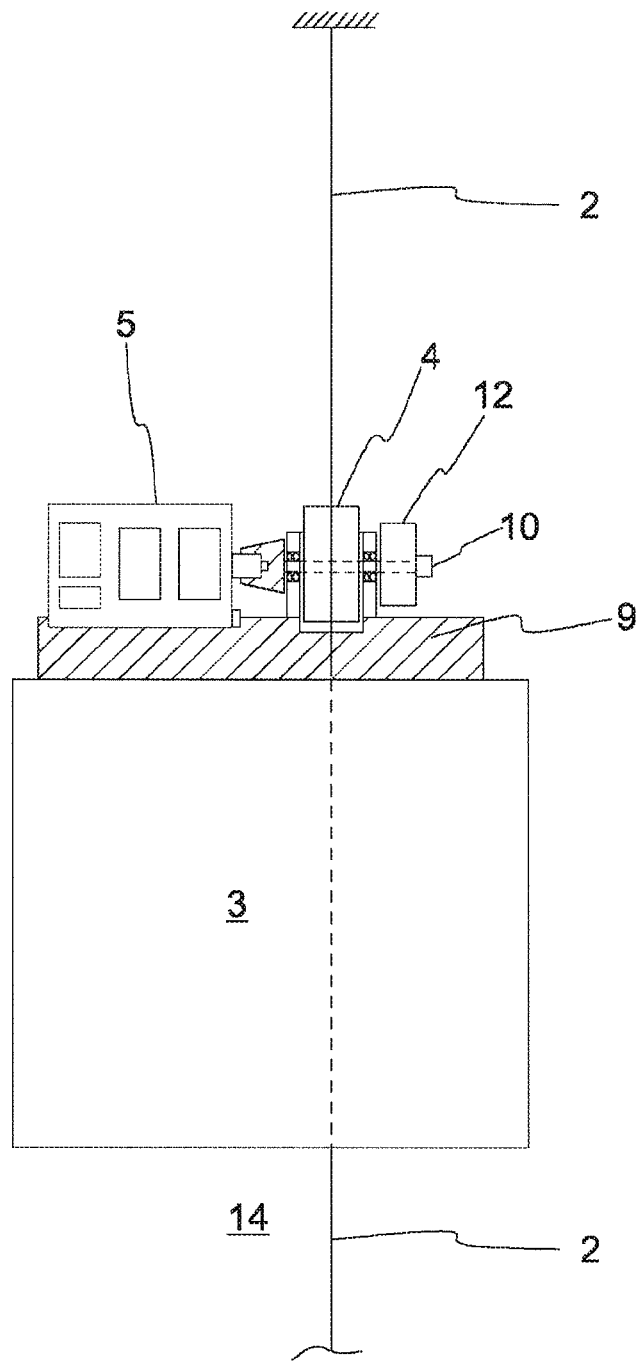
FIG. 3 presents a diagrammatic view of an elevator according to a third embodiment of the invention.

The elevator 1 of FIG. 3 differs from the elevators of FIGS. 1a and 2 in that a detachable drive unit 5 is fixed to a traction sheave 4 supported on the roof of the elevator car 3 in a manner allowing rotation, in connection with the traction sheave 4 via a reduction gear (not in figure). The elevator car 3 is suspended on a cable 2 by circulating the cable 2 once around a traction sheave 4. The cable 2 running in a vertical direction in the elevator tower 14 is fixed in position at its top end and at its bottom end on a supporting structure of the elevator tower 14. The drive unit 5 is in its basic principles according to embodiments 1 or 2, comprising the same functional parts; also the fixing of the shaft 8 of the electric motor in the drive unit 5 onto a rotating traction sheave 4 is of the same type as the fixing between the shaft 8 and the traction sheave/drum 4 in embodiments 1 or 2. The drive unit 5 is also fixed to a supporting structure of the roof of the elevator car 3 with the same type of quick-release fasteners as the fixing of the drive unit 5 to the machine bedplate 9 in embodiments 1 or 2. For this reason, the supporting structure of the roof of the elevator car is shaped and reinforced to receive a drive unit 5 to be lowered into position on the roof. Also the safety circuit 11 of the elevator as well as the electrical connection interface of the drive unit to the elevator 1 are implemented in essentially the same way as in embodiments 1 or 2. A user interface is fitted inside in the elevator car 3, said interface comprising pushbuttons according to embodiments 1 or 2 for driving the elevator car; the user interface is connected to the elevator control unit 18 in the drive unit 5 by taking a signal wire from the drive unit to the roof of the elevator car, to the connector on the drive unit 5. The drive unit 5 can also be transferred and used in servicing work and maintenance work in essentially the same way as is described in embodiments 1 or 2; in this embodiment of the invention the drive unit 5 must, however, first be lifted into position on the roof of the elevator car 3 for getting into operating condition.

FIG. 4 presents for the sake of illustration one connection interface of an elevator 1 according to any of the embodiments 1-3, to which interface the drive unit 5 is connected. The connection interface can be divided into a mechanical and an electrical connection interface.

The mechanical connection interface comprises an interface 6A for connecting the shaft 8 of the electric motor 7 of the drive unit to the traction sheave/drum 4. In addition, the mechanical connection interface comprises an interface 6B for connecting the frame part of the drive unit 5 into position in the machine bedplate/support structure of the elevator car 3.

The electrical connection interface comprises a connector 6C for taking the safety circuit of the elevator to the drive unit. The electrical connection interface also comprises a connector 6D for connecting the electrification of the elevator to the drive unit 5. The electrical connection interface further comprises a connector 6E for taking the measuring signal of a sensor, such as of an encoder 10, measuring the operation of the elevator to the drive unit 5 as well as a connector 6F, via which the control signal of the machinery brake is taken from the brake control circuit 26 of the drive unit to the machinery brake 12. Furthermore, the electrical connection interface comprises a connector 6G for connecting the user interface, disposed outside the drive unit 5, of an elevator to an elevator control unit 18 in the drive unit 5.

In embodiment 3 the drive unit 5 can alternatively also be disposed inside in the elevator car 3, in which case the traction sheave 4 can be situated immediately beside the wall outside the elevator car 3. The shaft 8 of the electric motor in this case goes through the wall of the elevator car 3, fastening to the traction sheave 4 with a chuck 6A, or with another quick-release detachable fixing, outside the elevator car 3. On the other hand, in embodiment 3 the drive unit 5 and also the traction sheave 4 can alternatively also be fixed to the bottom of the elevator car, for moving along with the elevator car. An advantage of the embodiments of the invention described here is that the drive unit does not need to be lifted to the roof of the elevator car 3 for a drive of the elevator 1.

In the preferred embodiments of the invention described above a manually-operated opening device is also fitted in connection with the machinery brake 2, when opening the machinery brake with which opening device the elevator car 3 is able to move freely in the elevator tower 14.

In some embodiments the electric motor 7 is disposed in a fixed manner in connection with a drum/traction sheave 4 in the elevator, and the drive unit comprises a detachable power supply device of the electric motor 7, which power supply device can be detached from the electric motor after a drive of the elevator has finished.

The invention is not only limited to be applied to the embodiments described above, but instead many variations are possible within the scope of the inventive concept defined by the claims.

The invention claimed is:

1. An elevator, comprising:
   one or more hoisting members;
   a load-receiving part suspended on the hoisting member; and
   a driving member connected to a hoisting member for moving the load-receiving part,
   wherein the driving member connected to the hoisting member is configured to be driven with a drive unit to be fixed for the duration of a drive to the driving member connected to the hoisting member,
   wherein the drive unit comprises a drive motor of the elevator and also a transmission mechanism in connection with the drive motor for transmitting from the drive unit the driving force produced by the drive motor, and wherein the driving member comprises a connection interface for receiving the transmission mechanism of the drive unit, and
   wherein the transmission mechanism of the drive unit is a shaft of the drive motor of the elevator, wherein the connection interface is a chuck and wherein the driving member is configured to be fixed to the shaft of the drive motor with said chuck.

2. The elevator according to claim 1, wherein the elevator comprises a connector, at least an electricity supply, control signal, measuring signal, and/or safety signal can be connected to the drive unit and detached from the drive unit with the connector.

3. The elevator according to claim 1, wherein the elevator comprises a machine bedplate, and wherein the machine bedplate comprises a connection interface for receiving a frame part of the drive unit.

4. The elevator according to claim 1, wherein the elevator comprises a connector for connecting the safety circuit of the elevator to the drive unit.

5. The elevator according to claim 1, wherein the elevator comprises a connector for connecting the electrification of the elevator to the drive unit.

6. The elevator according to claim 1, wherein the elevator comprises a sensor for measuring the operation of the elevator, and wherein the elevator comprises a connector for taking the measuring signal of sensor measuring the operation of the elevator to the drive unit.

7. The elevator according to claim 1, wherein the elevator comprises a machinery brake for braking the driving member, and wherein the elevator comprises a connector for taking the signal wire of the control signal of the machinery brake to the drive unit.

8. The elevator according to claim 1, wherein the elevator is disposed in the tower of a wind power turbine.

9. The elevator according to claim 8, wherein the drive unit is configured to be connected to an elevator in the bottom end zone of the turbine tower of a wind power turbine.

10. The elevator according to claim 1, wherein the elevator is disposed in a hoistway, which is at least partly open to the effect of outdoor air.

11. The elevator according to claim 1, wherein the elevator comprises a compensating weight, which is suspended to support the load-receiving part.

12. The elevator according to claim 11, wherein the drive unit comprises the control unit of the elevator.

13. A wind farm, comprising a plurality of wind power stations, each of which comprises a turbine tower for a wind turbine, wherein an elevator according to claim 1 is fitted into each of the turbine towers.

14. A drive unit for driving an elevator, wherein the drive unit is provided with a connector configured to connect the drive unit to the elevator for the duration of a drive of the elevator, wherein the drive unit comprises the drive motor of an elevator, and wherein the connector comprises a transmission mechanism configured to transmit from the drive unit the driving force produced by the drive motor, wherein the transmission mechanism of the drive unit is a shaft of the drive motor, and wherein the shaft of the drive motor is configured to be fixed to a driving member of the elevator with a chuck.

15. The drive unit according to claim 14, further comprising a signal wire configured to connect to a safety circuit of the elevator.

16. The drive unit according to claim 14, wherein the drive unit comprises one or more sensors for determining the connection status of the drive unit.

17. The drive unit according to claim 16, wherein the elevator comprises a machine bedplate for receiving the drive unit, and wherein the sensor determining the connection status of the drive unit is configured to detect the presence of the drive unit in the machine bedplate.

18. The drive unit according to claim 16, wherein the sensor determining the connection status of the drive unit is configured to detect the fixing between the transmission mechanism of the drive unit and the driving member.

19. The drive unit according to claim 16, wherein the one or more sensors determining the connection status of the drive unit are connected in the drive unit with a signal wire to the safety circuit of the elevator.

20. The drive unit according to claim 14, wherein the drive unit comprises a controllable power supply device of the drive motor.

21. A method for driving an elevator, comprising the step of:
connecting the drive unit of claim 14 to the elevator for the duration of a drive of the elevator.

22. The method according to claim 21, wherein the drive unit of the elevator is stored in a service center outside the time of use.

23. The method according to claim 21, wherein at least two different elevators are driven at different times with the same drive unit.

24. The method according to claim 21, wherein the elevator is driven with the drive unit.

25. The method according to claim 21, wherein the drive unit is detached from the elevator after the drive of the elevator has finished.

26. The method according to claim 21, wherein the drive unit is transferred to the operating location before the start of the drive of the elevator.

27. The method according to claim 25, wherein the drive unit detached from the elevator is transferred away from the operating location after the drive of the elevator has finished.

* * * * *